(12) United States Patent
Peters, Jr. et al.

(10) Patent No.: US 7,837,869 B2
(45) Date of Patent: Nov. 23, 2010

(54) SYSTEM FOR FILTERING STORMWATER

(75) Inventors: John Peters, Jr., Manorville, NY (US); John E. Markee, Selden, NY (US)

(73) Assignee: Fabco Industries, Inc., Jericho, NY (US)

( * ) Notice: Subject to any disclaimer, the term of this patent is extended or adjusted under 35 U.S.C. 154(b) by 0 days.

(21) Appl. No.: 12/171,356

(22) Filed: Jul. 11, 2008

(65) Prior Publication Data

US 2009/0014370 A1 Jan. 15, 2009

Related U.S. Application Data

(60) Provisional application No. 60/949,320, filed on Jul. 12, 2007.

(51) Int. Cl.
*E03F 5/14* (2006.01)
(52) U.S. Cl. .................. 210/164; 210/170.03; 210/474; 404/4
(58) Field of Classification Search ................. 210/163, 210/164, 170.03, 232, 474; 404/4, 5
See application file for complete search history.

(56) References Cited

U.S. PATENT DOCUMENTS

| | | | |
|---|---|---|---|
| 4,923,330 A | 5/1990 | DeTommaso | |
| 5,575,925 A * | 11/1996 | Logue, Jr. ................... | 210/164 |
| 5,622,630 A | 4/1997 | Romano | |
| 5,707,527 A | 1/1998 | Knutson et al. | |
| 5,744,048 A | 4/1998 | Stetler | |
| 5,954,952 A | 9/1999 | Strawser, Sr. | |
| 6,027,639 A | 2/2000 | Lenhart, Jr. et al. | |
| 6,059,964 A | 5/2000 | Strawser, Sr. | |
| 6,080,307 A | 6/2000 | Morris et al. | |
| 6,099,723 A | 8/2000 | Morris et al. | |
| 6,106,707 A | 8/2000 | Morris et al. | |
| 6,149,803 A * | 11/2000 | DiLoreto et al. ............ | 210/164 |
| 6,231,758 B1 | 5/2001 | Morris et al. | |
| 6,241,889 B1 | 6/2001 | Haley, III | |
| 6,277,274 B1 | 8/2001 | Coffman | |
| 6,350,374 B1 | 2/2002 | Stever et al. | |
| 6,368,499 B1 | 4/2002 | Sharpless | |
| 6,447,686 B1 | 9/2002 | Choi et al. | |
| 6,531,059 B1 * | 3/2003 | Morris et al. ................ | 210/164 |
| 6,551,023 B2 * | 4/2003 | Allard ......................... | 210/163 |
| 6,554,997 B1 * | 4/2003 | Schilling et al. ............ | 210/164 |
| 6,666,974 B2 * | 12/2003 | Page ........................... | 210/164 |
| 6,789,396 B2 | 9/2004 | Olin-Nunez et al. | |
| 7,112,274 B1 * | 9/2006 | Sanguinetti .................. | 210/163 |
| 2003/0034286 A1 | 2/2003 | Butler | |
| 2003/0047497 A1 * | 3/2003 | Harris et al. ................. | 210/163 |
| 2004/0094461 A1 * | 5/2004 | Sharpless ..................... | 210/163 |
| 2005/0000872 A1 * | 1/2005 | Middleton et al. ........... | 210/163 |
| 2005/0230317 A1 * | 10/2005 | Belasco et al. .............. | 210/163 |
| 2008/0073277 A1 * | 3/2008 | Paoluccio et al. ............ | 210/163 |

* cited by examiner

*Primary Examiner*—Christopher Upton
(74) *Attorney, Agent, or Firm*—Knoble Yoshida & Dunleavy, LLC

(57) ABSTRACT

A storm sewer insert includes a mounting assembly that is constructed and arranged to be mounted to a storm sewer system and a filter bag that is fabricated from a mesh material. The filter bag is releasably attached to the mounting assembly by a plurality of suspension elements that suspend the filter bag from the mounting assembly. The storm sewer insert may be provided with a covered bypass system for permitting excess storm water to bypass the filter bag in a manner that will facilitate the capture of floatable material that may be contained within the excess storm water.

13 Claims, 4 Drawing Sheets

SYSTEM FOR FILTERING STORMWATER

This application claims priority under 35 USC §119(e) based on U.S. Provisional Application Ser. No. 60/949,320, filed on Jul. 12, 2007, the entire disclosure of which is hereby incorporated by reference as if it were set forth fully herein.

BACKGROUND OF THE INVENTION

1. Field of the Invention

This invention relates generally to the field of environmental remediation of storm water. More specifically, this invention relates to an improved modular filtration system for a storm water system.

2. Description of the Related Technology

Storm water that is created by storm runoff in heavily developed areas is typically channeled into storm drainage systems that eventually drain into nearby streams, creeks, rivers or other bodies of water. Paved surfaces that bear automobile traffic typically become coated with significant pollutants such as heavy metals and volatile organic compounds, both under normal traffic conditions and in particular when motor vehicle accidents occur. When normal rain or snowfall occurs, these pollutants tend to be swept away with the runoff storm water and eventually lead to contamination of the bodies of water that eventually receive them. Such contamination has become a significant environmental issue in many areas. In addition, a significant amount of sediment and debris such as bottles and cans tends to be swept away by storm water runoff. Some of the debris is heavier than water, and some of it has the tendency to float. Storm water filtering systems have to be able to effectively filter both types of debris, in both ordinary and elevated flow conditions.

Depending on the location of a storm water system inlet, the primary environmental concern may be pollutants or it may be sedimentation and larger debris.

Systems exist for filtering storm water runoff that are effective to some extent in removing debris from storm water and in removing certain other pollutants, such as hydrocarbons. For example, U.S. Pat. No. 6,080,307 discloses a storm drain insert that contains one basket for the collection of debris as well as a canister that contains a hydrophobic, compliant, oil-absorbent copolymer material that is said to be effective in removing oil from the storm water. Additional systems for removing pollutants such as heavy metals from storm water have been commercialized by Fabco Industries Inc., the assignee of this application.

The removal of sedimentation and larger debris from storm water requires a system that is simple to install and to service, since the collected sedimentation and debris will have to periodically be removed from the system.

A need exists for an improved system and process for processing sediment and debris laden storm water that is effective under all conditions and in filtering all kinds of debris, inexpensive to deploy and cost-effective to service.

SUMMARY OF THE INVENTION

Accordingly, it is an object of the invention to provide an improved system and process for processing sediment and debris laden storm water that is effective under all conditions and in filtering all kinds of debris, inexpensive to deploy and cost-effective to service.

In order to achieve the above and other objects of the invention, a storm sewer insert according to a first aspect of the invention includes a mounting assembly that is constructed and arranged to be mounted to a storm sewer system; a filter bag that is fabricated from a mesh material; and a plurality of suspension elements for suspending the filter bag from the mounting assembly.

A filter bag for a storm sewer insert according to a second aspect of the invention includes a filter bag that is fabricated from a mesh material; and a plurality of suspension elements attached to the filter bag, each of the suspension elements being constructed and arranged to be releasably attached to a mounting assembly that is constructed and arranged to be mounted to a storm sewer system.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
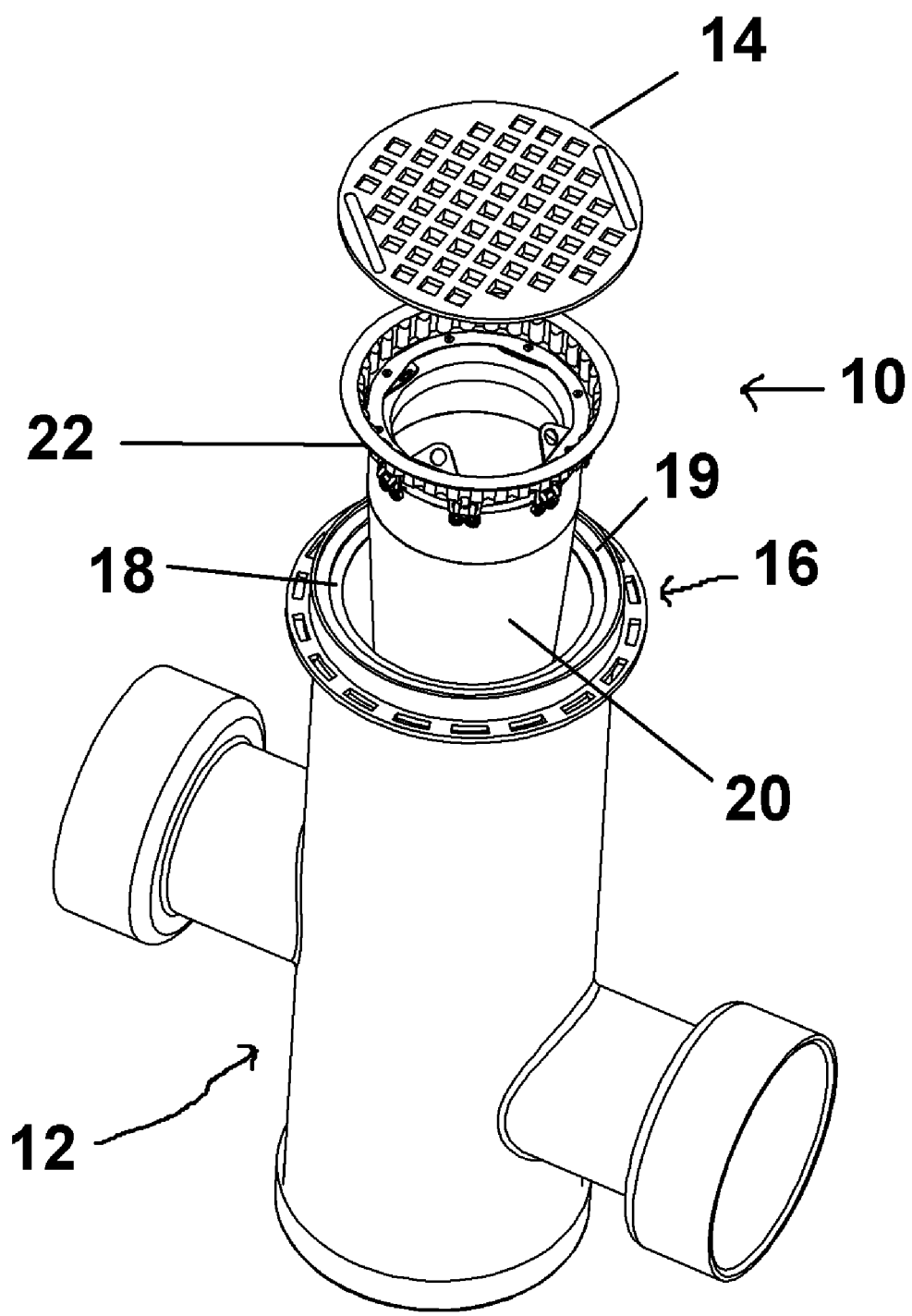
FIG. 1 is an exploded perspective view depicting a storm sewer insert according to a preferred embodiment of the invention.

Referring now to the drawings, wherein like reference numerals designate corresponding structure throughout the views, and referring in particular to FIG. 1, a storm sewer insert 10 according to a preferred embodiment of the invention is constructed and arranged to be mounted to a storm sewer system 12. The storm sewer system 12 typically has a grate 14 and a mounting flange 16 having concentric recessed annular rims 18, 19. The outer recessed annular rim 19 is sized and shaped to receive the grate 14 is during use. The inner recessed annular rim 18 is sized and shaped to receive a mounting assembly 22 of the storm sewer insert 10.

Storm sewer insert 10 preferably includes a filter bag 20 that is fabricated from a mesh material and a mounting assembly 22 for mounting the filter bag 20 in a position beneath the mounting flange 16 of the storm sewer system 12 in such a manner that storm water passing through the grate 14 will enter the filter bag 20 and be filtered by the mesh material.

The mesh material is preferably a woven geotextile fabric and preferably has an apparent opening size that is within a range of about 0.01 to about 2.0 mm. More preferably, the mesh material has an apparent opening size that is within a range of about 0.04 to about 1.2 mm. Most preferably, the mesh material has an apparent opening size of about 0.850 mm. A suitable material would be the woven geotextile fabric that is available under the brand name GEOTEX® 117F from SI Geosolutions of Chattanooga Tenn.

The mesh material further has a water flow rate that is within a range of about 1000 to about 20,000 l/min/m$^2$, and is more preferably within a range of about 4000 to about 12,00020,000 l/min/m$^2$.

Figure 2:
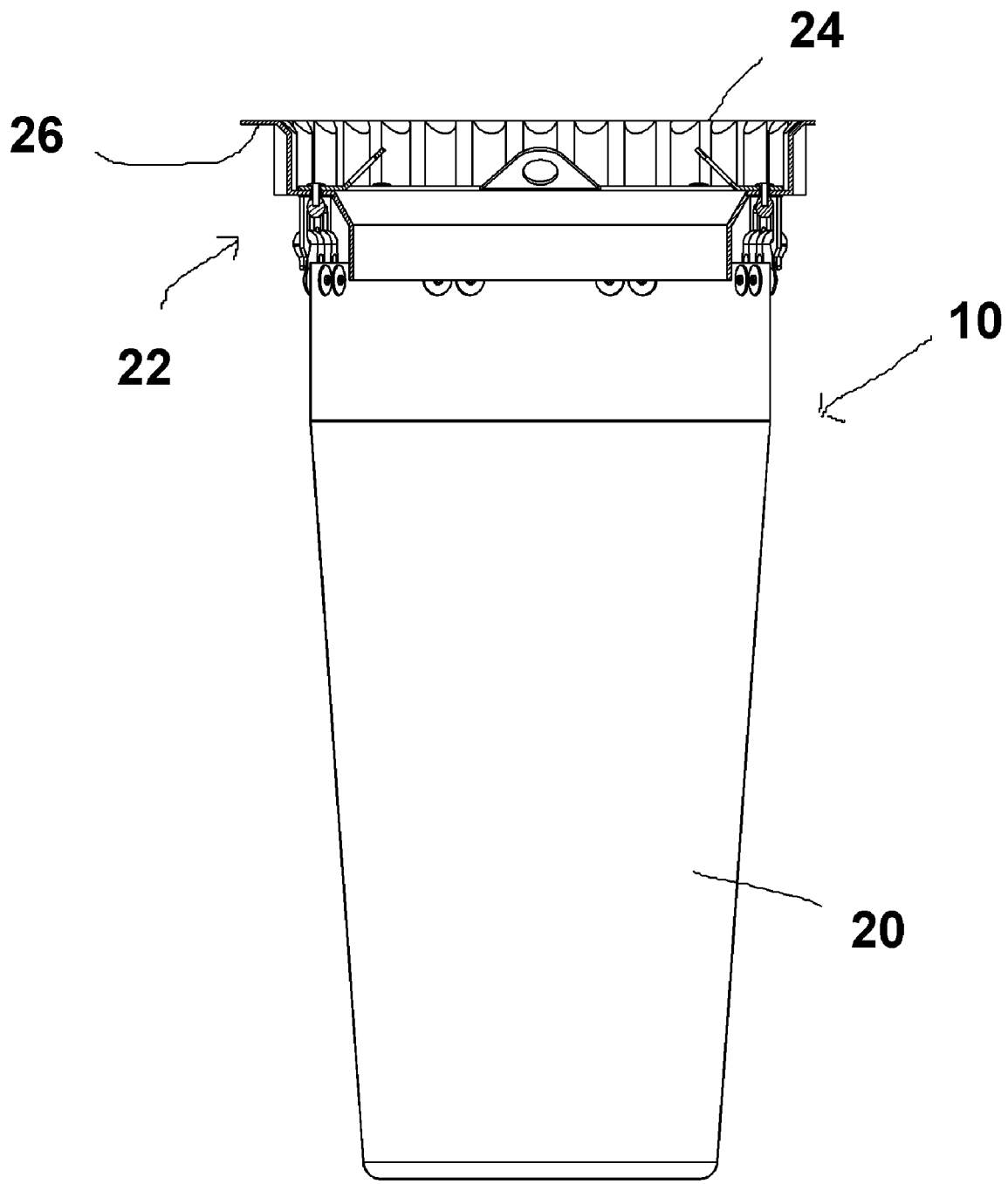
FIG. 2 is a longitudinal cross-sectional view depicting a storm sewer insert according to the embodiment of FIG. 1.

Referring now to FIG. 2, the mounting assembly 22 includes a shroud member 24 that preferably has a mounting flange 26 that is constructed and arranged to fit within and rest upon the inner annular rim 18 of the mounting flange 16 of the storm sewer system 12. The grate 14 is then positioned on top of the mounting flange 26 on the outer annular rim 19 during normal use of the storm sewer system 12.

Figure 3:
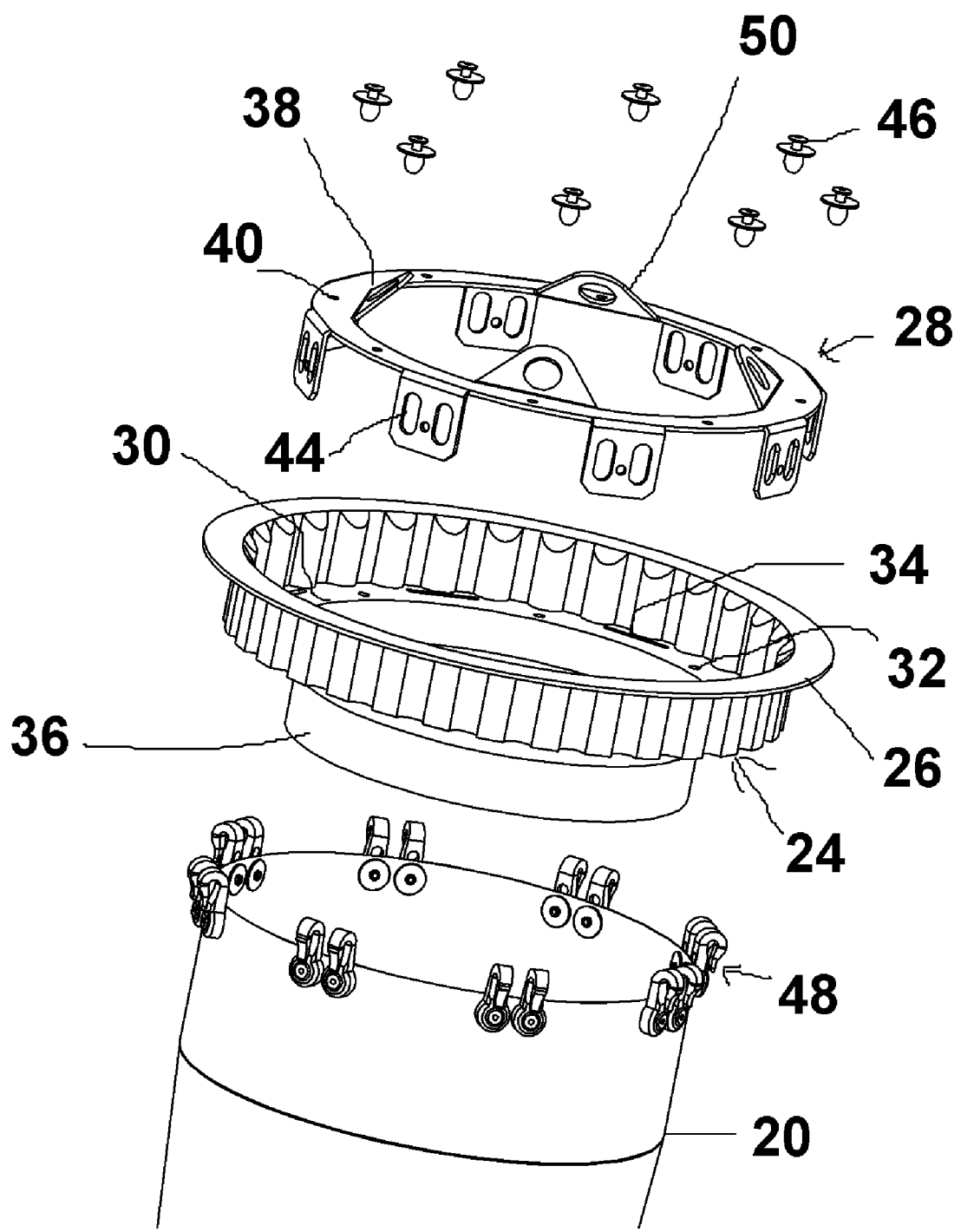
FIG. 3 is an exploded perspective view depicting one portion of a storm sewer insert that is constructed according to the embodiment of FIG. 1.

As is best shown in FIG. 3, the mounting assembly 22 further includes a hub member 28 that is adapted to be received within the shroud member 24. The shroud member 24 includes an inner support surface 30 that has a plurality of mounting holes 32 and also has a plurality of slots 34 defined therein. Shroud member 24 further includes a downwardly depending sidewall 36 that forms a closed tube for guiding storm water downwardly into the filter bag 20 as part of a covered bypass arrangement that will be described in greater detail below.

The hub member 28 includes a main body portion 38 having a plurality of mounting holes 40 defined therein. Hub member 28 further includes a plurality of downwardly depending hanger members 42, each of which has at least one hole or opening 44 defined therein for purposes that will be described in greater detail below. In the preferred embodiment, each hanger member 42 has two holes or openings 44 defined therein.

The hub member 28 further includes a plurality of lifting lugs 50 extending upwardly and radially inwardly from the main body portion 38. Each of the lifting lugs 50 preferably defines an opening in which a lifting mechanism such as a chain, hook or other lifting tool can be used in order to lift the storm sewer insert 10 out of the storm sewer system 12 during maintenance and deployment procedures, as will be described in greater detail below.

The hub member 28 is preferably permanently secured to the shroud member 24 by a plurality of rivets 46 that pass through the respective mounting holes 32, 40. The downwardly depending hanger members 42 extend through the respective slots 34 that are defined in the inner support surface 30 of the shroud member 24.

Figure 4:
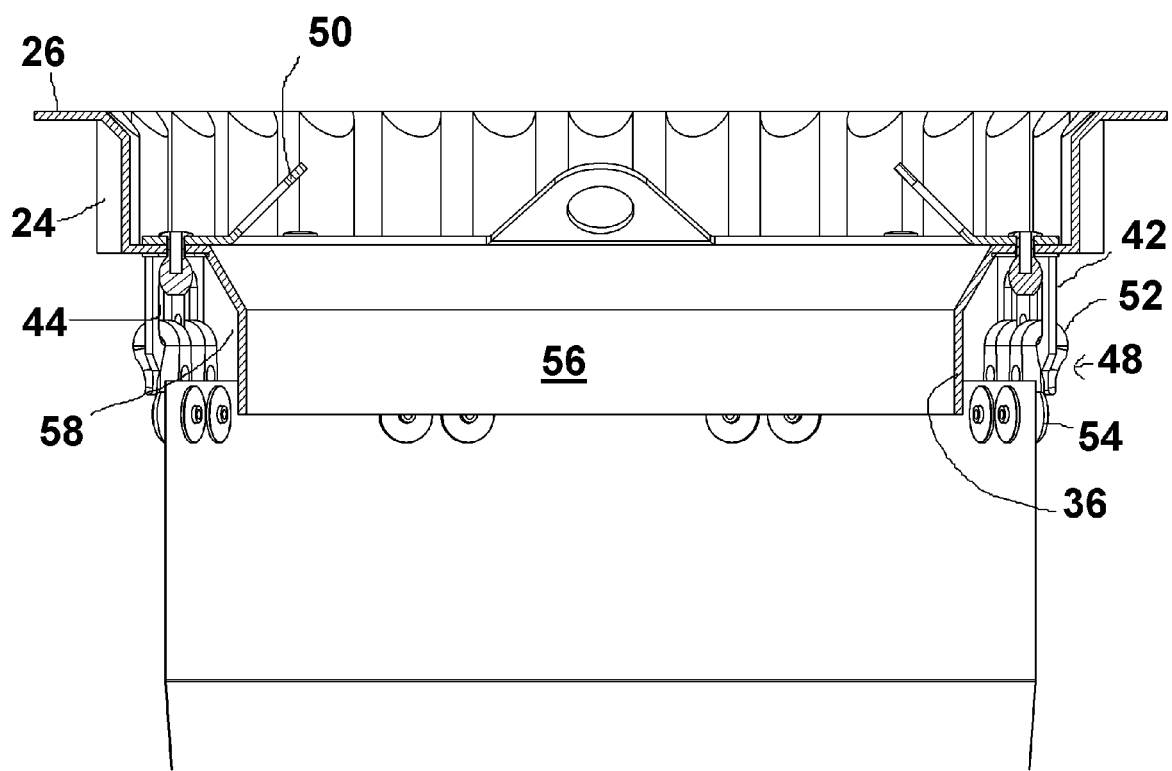
FIG. 4 is a longitudinal cross-sectional view depicting a portion of the storm sewer insert that is constructed according to the embodiment of FIG. 1.

The filter bag 20 is preferably provided with a plurality of suspension elements 48 for suspending the filter bag 20 from the mounting assembly 22. In the preferred embodiment, the suspension elements 48 are embodied as a plurality of hook members 52 that are secured to the mesh fabric of the filter bag 20 by reinforced rivets 54. The hook members 52 are arranged in pairs around a periphery of the open end of the filter bag 20 so as to register with the openings 44 in the downwardly depending hanger members 42. As is best shown in FIG. 4, each of the hook members 52 is received in one of the openings 44 so that the filter bag 20 is suspended beneath the mounting assembly 22.

Alternatively, other alternative types of suspension elements and mounting arrangements could be used within the ambit of the invention, such as other mechanical interlocking arrangements, support cables, tension mechanisms and so forth.

The downwardly depending tubular sidewall 36 of the shroud member 24 forms a first flow path 56 in which all storm water entering the storm sewer system 12 is forced to pass. In ordinary flow conditions, all of the storm water falls within and is filtered by the filter bag 20. In conditions of unusually high flow such as may be encountered during a severe rainstorm, excess storm water that cannot be filtered by the filter bag 20 is initially forced into the upper portion of the filter bag 20 through the flow path 56, but is permitted to escape through a covered bypass arrangement that includes a second flow path 58 that is defined between the downwardly depending tubular sidewall 36 of the shroud member 24 and the upper edge of the filter bag 20. The covered bypass arrangement ensures that floatable material will remain trapped to the extent possible by the filter bag 20 while excess storm water is permitted to escape.

The storm sewer insert 10 is deployed in a storm sewer system 12 by securing a filter bag 20 to the mounting assembly as described above and suspending the storm sewer insert 10 from the mounting flange 16 of the storm sewer system 12 as has been previously described. As storm water passes through the filter bag 20, material such as debris and sedimentation is collected within the filter bag 20.

Periodically, the storm sewer insert 10 must be serviced in order to remove the collected debris and sedimentation from the filter bag 20 or to replace the filter bag 20. In order to perform such service, the grate 14 is removed from the storm sewer system 12 and the entire storm sewer insert 10 is lifted out of the storm sewer system 12 by engaging the lifting lugs 50 with a lifting mechanism. The filter bag 20 is then detached from the mounting assembly 22 by disengaging the hook members 52 from the downwardly depending hanger members 42. The filter bag 20 is then emptied of debris and sedimentation or it is replaced with a replacement filter bag 20. The emptied filter bag 20 or the replacement filter bag 20 is then secured to the mounting assembly 22 and the storm star insert 10 is redeployed into the storm sewer system 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A storm sewer insert, comprising:
   a mounting assembly that is constructed and arranged to be mounted to a storm sewer system, wherein said mounting assembly comprises a mounting flange having a annular rim;
   a filter bag that is fabricated from a mesh material, said filter bag having an upper end;
   a downwardly depending shroud connected to said mounting assembly and having a lower end that extends within said filter bag;
   a plurality of suspension elements for suspending the filter bag from the mounting assembly; and
   at least one covered bypass path for permitting an excess flow of storm water to bypass the filter bag in conditions of unusually high flow when the volume of storm water entering said storm sewer insert exceeds a throughput capacity of said filter bag, said covered bypass path being defined in part by said upper end of said filter bag and said lower end of said downwardly depending shroud, whereby the excess flow of storm water is forced into an upper portion of the filter bag before it escapes through the bypass path so that floatable material can be retained within the filter bag.

2. A storm sewer insert according to claim 1, wherein said mesh material comprises a geotextile fabric.

3. A storm sewer insert according to claim 2, wherein said geotextile fabric comprises a woven geotextile fabric.

4. A storm sewer insert according to claim 3, wherein said woven geotextile fabric has an apparent opening size that is within a range of about 0.01 to about 2.0 mm.

5. A storm sewer insert according to claim 4, wherein said woven geotextile fabric has an apparent opening size that is within a range of about 0.04 to about 1.2 mm.

6. A storm sewer insert according to claim 1, wherein said mesh material has an apparent opening size that is within a range of about 0.01 to about 2.0 mm.

7. A storm sewer insert according to claim 6, wherein said mesh material has an apparent opening size that is within a range of about 0.04 to about 1.2 mm.

8. A storm sewer insert according to claim 1, wherein said mesh material has a water flow rate that is within a range of about 1000 to about 20,000 l/min/m².

9. A storm star insert according to claim 8, wherein said mesh material has a water flow rate that is within a range of about 4000 to about 12,000 l/min/m².

10. A storm sewer insert according to claim 1, wherein said plurality of suspension elements comprises a plurality of hook members.

11. A storm sewer insert according to claim 10, wherein said hook members are attached to said filter bag.

12. A storm sewer insert according to claim 10, wherein said plurality of suspension elements further includes a plurality of hanger members, each of said hanger members having an opening defined therein for receiving a respective one of said hook members.

13. A storm sewer insert, comprising:

a mounting assembly that is constructed and arranged to be mounted to a storm sewer system;

a filter bag that is fabricated from a mesh material, said filter bag having an upper end;

a downwardly depending shroud connected to said mounting assembly and having a lower end that extends within said filter bag, wherein said downwardly depending shroud is integral with said mounting assembly;

a plurality of suspension elements for suspending the filter bag from the mounting assembly; and at least one covered bypass path for permitting an excess flow of storm water to bypass the filter bag in conditions of unusually high flow when the volume of storm water entering said storm sewer insert exceeds a throughput capacity of said filter bag, said covered bypass path being defined in part by said upper end of said filter bag and said lower end of said downwardly depending shroud, whereby the excess flow of storm water is forced into an upper portion of the filter bag before it escapes through the bypass path so that floatable material can be retained within the filter bag.

* * * * *